(12) United States Patent
Maas et al.

(10) Patent No.: US 10,876,856 B2
(45) Date of Patent: Dec. 29, 2020

(54) AIRCRAFT HUD WITH CURVED TAPES AND FLIGHT MODE ANNUNCIATION BOXES

(71) Applicant: Gulfstream Aerospace Corporation, Savannah, GA (US)

(72) Inventors: Justin Maas, Savannah, GA (US); Christopher Watkins, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 24 days.

(21) Appl. No.: 16/242,150

(22) Filed: Jan. 8, 2019

(65) Prior Publication Data
US 2019/0212168 A1 Jul. 11, 2019

Related U.S. Application Data

(60) Provisional application No. 62/615,805, filed on Jan. 10, 2018.

(51) Int. Cl.
*G01C 23/00* (2006.01)
*G02B 27/01* (2006.01)
(Continued)

(52) U.S. Cl.
CPC .............. *G01C 23/00* (2013.01); *B64D 43/00* (2013.01); *B64D 45/00* (2013.01); *G02B 27/01* (2013.01);
(Continued)

(58) Field of Classification Search
CPC .... G01C 23/00; G02B 27/01; G02B 27/0101; G02B 2027/0141; G02B 2027/014; B64D 43/00; B64D 45/00
See application file for complete search history.

(56) References Cited

U.S. PATENT DOCUMENTS

2005/0237226 A1 10/2005 Judge et al.
2007/0182590 A1* 8/2007 Younkin ................ G01C 23/00
340/973
(Continued)

FOREIGN PATENT DOCUMENTS

EP 2133728 A2 12/2009
EP 2133728 A3 11/2011
(Continued)

OTHER PUBLICATIONS

Anonymous, SA Photonics SA-83S, Retrieved from the Internet, Jan. 8, 2015.
(Continued)

*Primary Examiner* — Tapas Mazumder
(74) *Attorney, Agent, or Firm* — LKGlobal | Lorenz & Kopf, LLP

(57) ABSTRACT

Aircraft, computing devices, and Head-Up Displays (HUDs) are provided. An aircraft includes an avionics system with a display screen and a controller. The display screen is configured to present an image arrangement that is visible to a user. The controller is configured to generate curved tapes in the image arrangement to convey flight values to the user. The curved tapes are configured to direct an eye of the user to a portion of the image arrangement. The controller is further configured to roll the curved tapes three-dimensionally based on changes to flight values of the aircraft to provide peripheral indication of changes to flight values when the flight values are changing.

13 Claims, 3 Drawing Sheets

(51) Int. Cl.
*B64D 45/00* (2006.01)
*B64D 43/00* (2006.01)

(52) U.S. Cl.
CPC .... G02B 27/0101 (2013.01); *G02B 2027/014* (2013.01); *G02B 2027/0141* (2013.01)

(56) References Cited

U.S. PATENT DOCUMENTS

| | | | |
|---|---|---|---|
| 2008/0262664 A1 | 10/2008 | Schnell | |
| 2012/0286975 A1 | 11/2012 | Thomson | |
| 2013/0135202 A1* | 5/2013 | Louise-Babando | G01C 23/00 345/157 |
| 2016/0299506 A1* | 10/2016 | Bruggeman | B64D 31/06 |
| 2017/0075556 A1* | 3/2017 | Kulkarni | G08G 5/0021 |

FOREIGN PATENT DOCUMENTS

| | | |
|---|---|---|
| EP | 2610590 A2 | 7/2013 |
| EP | 2610590 A3 | 12/2013 |
| EP | 3511249 A2 | 7/2019 |

OTHER PUBLICATIONS

Timothy O'Leary, Heads Up Display (HUD), of F18, Retrieved from Internet, Jul. 29, 2019.

\* cited by examiner

AIRCRAFT HUD WITH CURVED TAPES AND FLIGHT MODE ANNUNCIATION BOXES

CROSS-REFERENCE TO RELATED APPLICATIONS

This application claims the benefit of U.S. Provisional Application No. 62/615,805 filed on Jan. 10, 2018. The disclosure of the above application is incorporated herein by reference.

TECHNICAL FIELD

The technical field relates generally to aircraft displays, and more particularly relates to Head-Up Displays (HUDs) and heads down displays that display curved altitude and airspeed tapes and curved boxes around Flight Mode Annunciations.

BACKGROUND

Aircraft Head-Up Displays (HUDs) typically include vertically oriented straight lines on the left and right side of a display portion. The lines correspond with altitude and airspeed indicators that indicate the current airspeed and altitude for a crew member using the HUD.

Although such conventional HUDs are functional, improved HUD displays may be desirable. Desirable features and characteristics of the disclosed embodiments will become apparent from the subsequent summary and detailed description, and the appended claims, taken in conjunction with the accompanying drawings and this background.

SUMMARY OF EMBODIMENTS

Various non-limiting embodiments of aircraft, computing devices, and Head-Up Displays (HUDs) are disclosed herein.

In a first non-limiting embodiment, an aircraft includes, but is not limited to, an avionics system with a display screen and a controller. The display screen is configured to present an image arrangement that is visible to a user. The controller is configured to generate curved tapes in the image arrangement to convey flight values to the user. The curved tapes are configured to direct an eye of the user to a portion of the image arrangement. The controller is further configured to roll the curved tapes three-dimensionally based on changes to flight values of the aircraft to provide peripheral indication of changes to flight values when the flight values are changing.

In some examples, the controller may be configured to generate: curved Flight Mode Annunciation boxes in the image arrangement; the curved tapes as a left tape and a right tape at a left side and a right side of the display screen; the curved tapes with a distance between centers of the curved tapes being less than a distance between respective ends of adjacent curved tapes; the curved tapes as an altitude tape and an airspeed tape; a flight path indicator at the portion of the image arrangement and to generate the curved tapes to direct the eye of the user to the flight path indicator as the portion of the image arrangement; and/or the curved tapes with a radius of about 8.9 inches and a dimension of 0.3 radians. In some examples, the aircraft includes a fuselage window having a curvature, and at least one of the curved tapes and the curved Flight Mode Annunciation boxes has a curvature that is substantially similar to the curvature of the fuselage window. In some examples, the display screen is a Head-Up Display (HUD).

In a second non-limiting embodiment, a computing device includes, but is not limited to, a display screen. The computing device is configured to display on the display screen: an image arrangement including navigational information for a vehicle; and curved tapes that convey navigational values to a user and are configured to direct an eye of the user to a predefined portion of the image arrangement. The controller is further configured to roll the curved tapes three-dimensionally based on changes to navigational values of the vehicle to provide peripheral indication of changes to navigational values when the navigational values are changing In some examples, the computing device is further configured to display on the screen: curved Flight Mode Annunciation boxes; the curved tapes as a left tape and a right tape at a left side and a right side of the display screen; the curved tapes with a distance between centers of the curved tapes being less than a distance between respective ends of adjacent curved tapes; the curved tapes as an altitude tape and an airspeed tape; and/or the curved tapes with a radius of about 8.9 inches and a dimension of 0.3 radians. In some examples, the display screen is a Head-Up Display (HUD). In some examples, the computing device is further configured to generate a navigational indicator at the predefined portion of the image arrangement and to generate the curved tapes to direct the eye of the user to the navigational indicator as the predefined portion of the image arrangement.

In a third non-limiting embodiment, a Head-Up Display (HUD) includes a controller and a HUD screen configured to present an image arrangement that is visible to a user. The controller is configured to generate curved tapes in the image arrangement to convey flight values to the user and to generate a navigational indicator, where the curved tapes are configured to direct an eye of the user to the navigational indicator in the image arrangement. The controller is further configured to roll the curved tapes three-dimensionally based on changes to flight values of the aircraft to provide peripheral indication of changes to flight values when the flight values are changing In some examples, the controller is further configured to generate the curved tapes as a left tape and a right tape at a left side and a right side of the HUD screen. In some examples, the controller is further configured to generate the curved tapes with a distance between centers of the curved tapes being less than a distance between respective ends of adjacent curved tapes.

DETAILED DESCRIPTION

Figure 1:
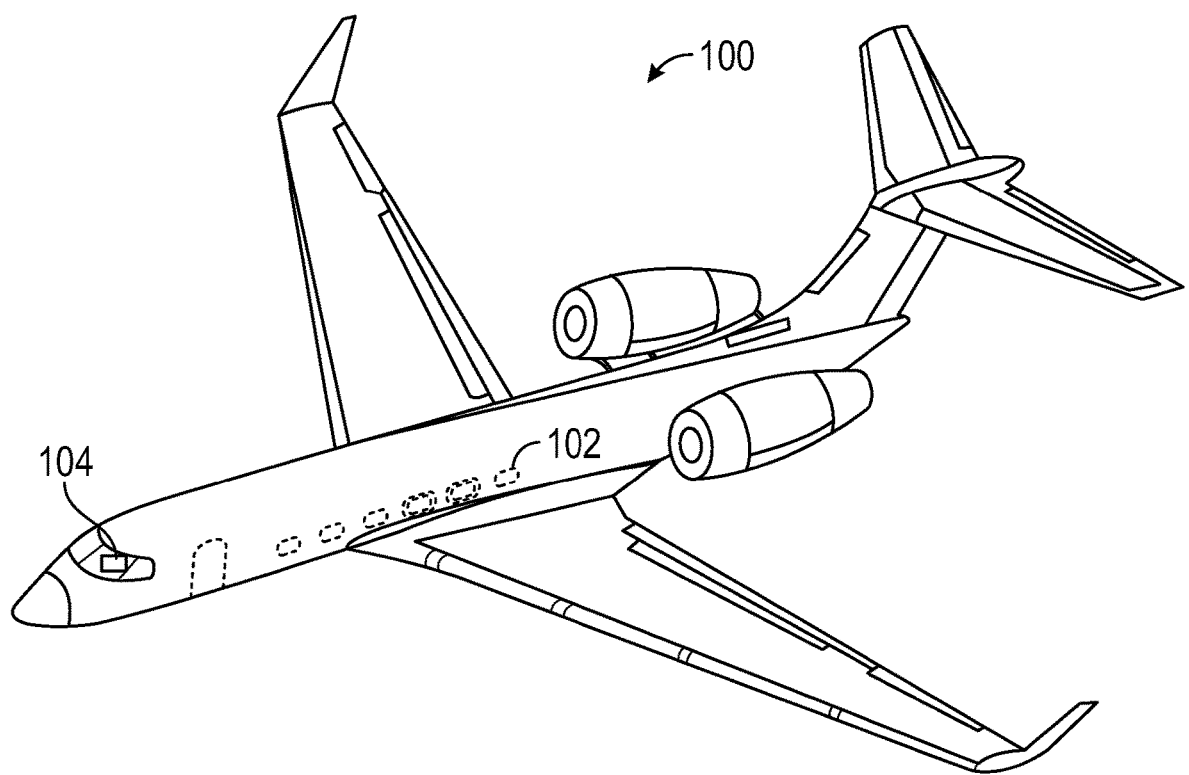
FIG. 1 is a perspective view illustrating an aircraft with an avionics system.

The following detailed description is merely exemplary in nature. Furthermore, there is no intention to be bound by any theory presented in the preceding background or the following detailed description.

Various non-limiting embodiments of aircraft, computing devices, and Head-Up Displays (HUDs) are disclosed herein. The Head-Up Displays (HUDs) disclosed herein include curved altitude and airspeed tapes. In some embodiments, boxes surrounding Flight Mode Annunciations are curved with a curvature that is similar to a curvature of fuselage windows on the aircraft. A greater understanding of the disclosed embodiments may be obtained through a review of the illustrations accompanying this application together with a review of the detailed description that follows.

The left and right side of a graphic user interface show tapes with inflections toward or away from the center of the display. The benefits of the curved tapes to the functioning of graphical user interfaces may include 1) focusing the pilot's scan/attention, 2) clearing or decluttering an area around a runway in the image, and 3) improved sense of change.

The inflections focus a user's eye toward the center of the display where the flight path vector/marker is located along with a horizon marker. Pilots of the aircraft use the flight path vector/marker and the horizon marker to help fly the aircraft.

Curving the tapes also "declutters" the area in the vicinity of the runway to maximize the amount of clear area around the landing runway. Maximizing the amount of clear area around the landing runway permits unimpeded viewing of the landing environment and any synthetic or enhanced imagery in that area.

Furthermore, the tape movement provides a visual sense of speed/altitude change using peripheral vision when pilots are focused on navigational information between the curved tapes. Pilots may not need to read/interpret actual speed values because the curved tape provides a visual cue. The three-dimensional effect of the tape moving/rolling can further enhance the pilot's perception of changes to speed/altitude while remaining focused on center of the display.

Accordingly, the disclosed embodiments improve the efficiency of using HUDs and displays that utilize the curved tapes. For example, the speed of a user's navigation to the flight path vector/marker can be improved because it saves the user from scanning larger portions of the HUD to locate the flight path/marker. Rather than scanning the entire display, the user may be directed to scan a smaller area corresponding to the curve of the tapes. Such improved efficiency of a computer generated graphical user interface is an improvement in the functioning of computers. As will be appreciated by those of ordinary skill in the art, the flight path vector moves within the display to represent the flight path vector of the aircraft. Although the flight path/vector may collide with the tapes in some uncommon flight scenarios (e.g., heavy cross wind, etc.), the curved tapes direct a pilot's view to the most likely location of the flight path/vector during normal flight scenarios.

The three Flight Mode Annunciations at the top of the example HUD have curved boxes. In the example provided, the top and bottom of the indicator boxes are curved while the left and right sides of the boxes are straight. In the example provided, the boxes are only displayed when there is a Flight Mode Annunciation (FMA) to display. The FMA indicated within the boxes vary based on the modes of the aircraft, as will be appreciated by those of ordinary skill in the art.

FIG. 1 is a perspective view illustrating a non-limiting embodiment of an aircraft 100 in accordance with the teachings of the present disclosure. In the example provided, aircraft 100 is a transport category aircraft. It should be appreciated that aircraft 100 may be any type of vehicle, such as an airplane, a helicopter, a submarine, and the like without departing from the scope of the present disclosure. Aircraft 100 includes fuselage windows 102 and an avionics system 104. Fuselage windows 102 have a vertical curvature on the top and bottom sides of fuselage windows 102 and have a fore/aft curvature on the front and back sides of fuselage windows 102. In some embodiments, the windows have rectangular or other shaped windows. In some embodiments, such as in a submarine, no windows are included in the vehicle body.

Figure 2:
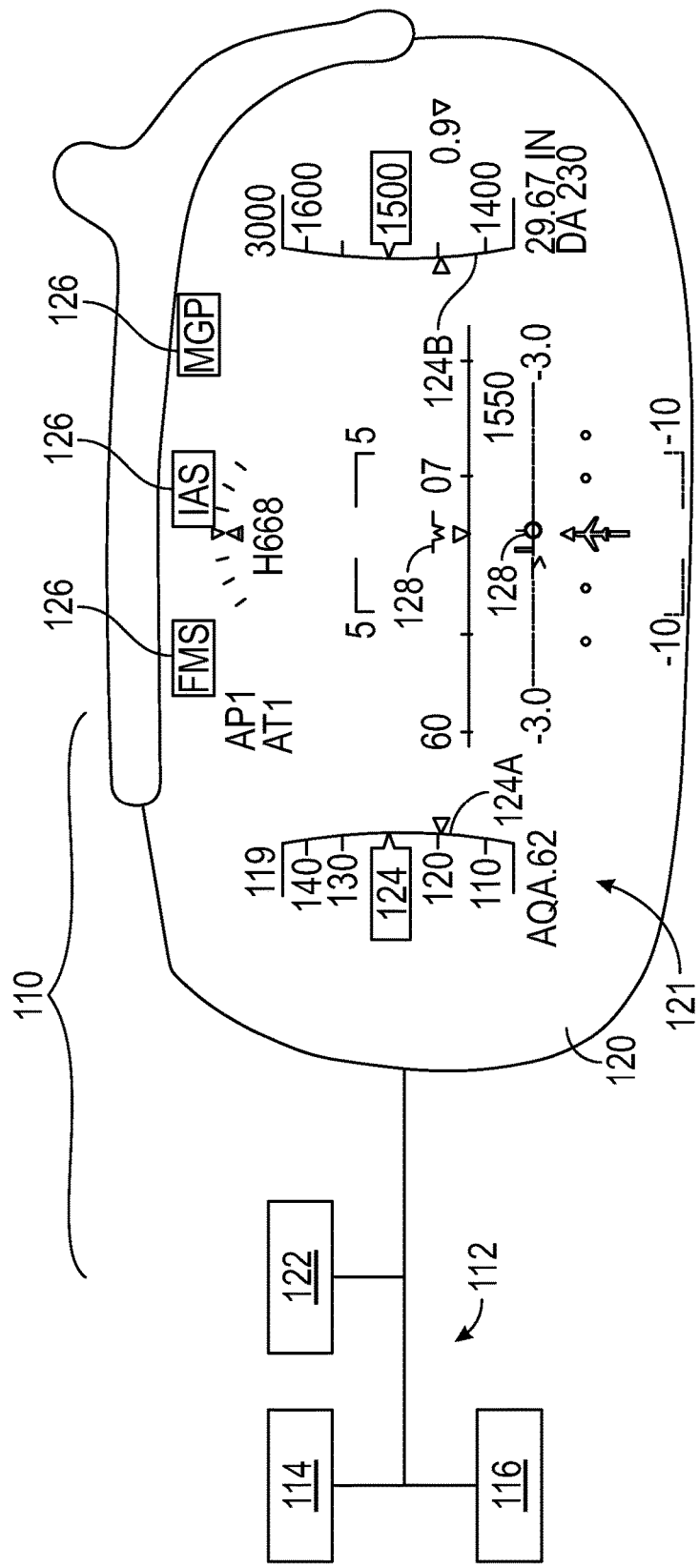
FIG. 2 is a simplified block diagram illustrating a non-limiting embodiment of an avionics system in accordance with the teachings of the present disclosure.

Referring now to FIG. 2, avionics system 104 is illustrated in a simplified block diagram. Avionics system 104 includes a Head-Up Display (HUD) 110, a communication bus 112, an aircraft controller 114, and a plurality of sensors 116. In some embodiments, HUD 110 is supplemented or replaced by a heads down avionics display presenting a similar image arrangement.

HUD 110 includes a display screen 120 and a HUD controller 122. In the example provided, display screen 120 is a clear material that presents collimated light towards a user's eye by any suitable technology. The collimated light may form a visible pattern or image arrangement 121 on the clear material so that the user is able to perceive the image arrangement while also seeing objects through the HUD. The image arrangement is a form of graphical user interface (GUI) that allows users to interact with electronic devices through graphical icons and visual indicators.

Image arrangement 121 presents navigational information to a user and includes a left curved tape 124A, a right curved tape 124B, Flight Mode Annunciation (FMA) boxes 126, and at least one flight path indicator 128. Tapes in HUD images present a curved line with annotated numerals spaced apart at intervals according to the value difference between adjacent presented numerals. The numerals indicate some flight value or other navigational value to be communicated to the crew member using the HUD. In the example provided, curved tapes 124A-B and the corresponding numerals present airspeed and altitude information for a pilot, as will be appreciated by those of ordinary skill in the art. It should be appreciated that the type of navigational values conveyed by the tapes may vary when image arrangement 121 is located in an automobile, submarine, other aircraft, or other type of vehicle. The tapes and numerals move along a lengthwise direction of the tapes as the respective numeral value changes during flight of the aircraft In the example provided in FIG. 2, tapes 124A-B curve outward so that centers of tapes 124A-B are closer together than are respective ends of adjacent tapes 124A-B (e.g., tapes 124A-B are concave). In the example provided, tapes 124A-B have the same length and radius of curvature. It should be appreciated that the specific curvature and length of tapes 124A-B may vary without departing from the scope of the present disclosure. In the example provided, the tape has a radius of curvature of about 8.9 inches and is about 0.3 radians. In some embodiments, the curvature of tapes 124A-B matches the vertical or fore/aft curvature of fuselage windows 102. In some embodiments, tapes 124A-B have a radius of curvature that is between 10% larger and 10% smaller than the radius of curvature illustrated. In some embodiments, tapes 124A-B have a radius of curvature that is between 20% larger and 20% smaller than the radius of curvature illustrated. In some embodiments, tapes 124A-B have a radius of curvature that is between 50% larger and 50% smaller than the radius of curvature illustrated. In some embodiments, tapes 124A-B have a radius of curvature that is between 100% larger and 100% smaller than the radius of curvature illustrated. In some embodiments, tapes 124A-B have a radius of curvature that is between 200% larger and 200% smaller than the radius of curvature illustrated. In some embodiments, tapes 124A-B have a radius of curvature that is larger than 200% or smaller than 200% smaller than the radius of curvature illustrated.

Figure 4:
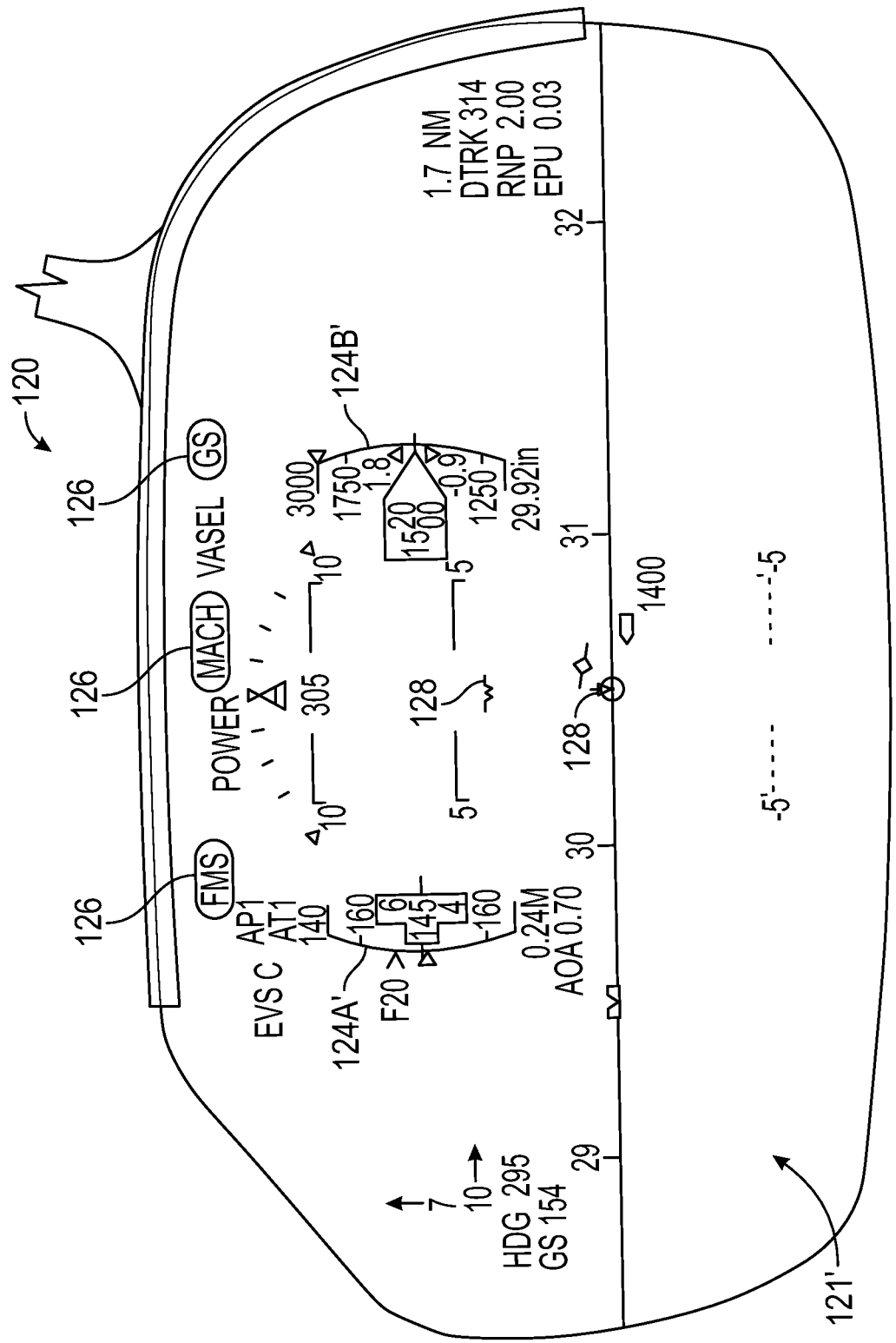
FIG. 4 is a simplified diagram illustrating a non-limiting embodiment of a Head-Up Display screen of the aircraft in accordance with the teachings of the present disclosure.

Referring now to FIG. 4, and with continued reference to FIGS. 1-2, display screen 120 is illustrated with an alternative image arrangement 121'. Image arrangement 121' is similar to image arrangement 121, where like numbers refer to like components. Image arrangement 121', however, includes convex tapes 124A' and 124B' instead of concave tapes 123A-B. Tapes 124A' and 124B' curve the opposite direction of the curvature of tapes 124A-B. For example, the ends of tapes 124A' and 124B' are closer to the center of image arrangement 121 to frame the navigational information in the center of the display.

Referring again to FIGS. 1-3, FMA boxes 126 are lines surrounding Flight Mode Annunciations near the top of display screen 120.

Flight path indicators 128 may be any indicator that conveys a current flight path, a target flight path, a pitch reference, a target pitch rotation, a horizon, and/or may include other indicators generally located in a center of image arrangement 121. For example, flight path indicators 128 may include a current flight path vector/marker indicating a current flight path of the aircraft and may include a pitch reference indicator.

Figure 3:
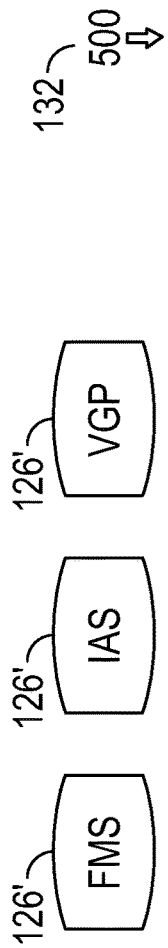
FIG. 3 is a simplified view of illustrating a portion of a Head-Up Display of the aircraft in accordance with the teachings of the present disclosure.

Referring now to FIG. 3, and with continued reference to FIGS. 1 and 2, FMA boxes 126' and a vertical speed indicator 132 (VSI 132) are illustrated in accordance with some embodiments. FMA boxes 126' are similar to FMA boxes 126, but are bowed or curved to complement the bow or curve in the tapes. In some embodiments, the curvature is similar to the vertical or fore/aft curvature of fuselage windows 102. In the example provided, the FMA boxes 126' have a curvature of about 0.67 inches radius and 0.625 radians. The curvature of FMA boxes 126' may vary according to the same ranges as given for tapes 124A-B or may vary in different amounts from the curvature illustrated.

The FMA box curvature also improves the functionality of computers. For example, the curved boxes provide area centered above and below the FMA text for potentially showing additional graphical indications related to the flight mode of the aircraft.

The box curvature may also clarify the purpose of the information presented in the boxes. For example, the main purpose of the Flight Mode Annunciations is to help crew understand "why" speed and altitude targets are being directed. The relation between FMA box curvature and aircraft window curvature may convey that the FMA box area is a "window" into "why" the automated speed and altitude targets are being directed.

The curvature of the boxes also may provide a larger touch area for typically-small FMA boxes on touch-enabled heads-down display if the FMA box is used by the pilot to change the flight mode. The FMA boxes may be touch-enabled to enable pilot to change condition driving "why" particular flight mode was being directed.

VSI 132 is an indication of a vertical speed of the aircraft. In the example provided, VSI 132 appears below the altitude tape when the vertical speed of the aircraft is nonzero. The arrow in VSI 132 visually indicates the direction of altitude change. For example, the down arrow indicates the vertical velocity is in descent at 500 feet per minute. An "up" arrow may indicate that the aircraft is climbing at the rate indicated by the numeral in VSI 132.

HUD controller 122 controls components that cause display screen 120 to present the image arrangement. In some embodiments, HUD controller 122 is also configured to generate the image arrangement. Aircraft controller 114 controls flight and communication within aircraft 100. In some embodiments, controller 122 is configured to generate the image arrangement.

Controllers 122 and 114 are physical devices that may include any control logic or control circuitry capable of generating the image arrangement. For example, the control logic may be a processor, such as a microprocessor, microcontroller, or digital signal processor (DSP), configured to execute instructions directing the processor to perform the functions described herein. In another implementation, the control logic may be hardware-based logic, or may include a combination of hardware, firmware, and/or software elements.

The control logic is coupled with a memory. The memory may be any device or component capable of storing digital data, such as one or more integrated circuits of static random access memory (SRAM), dynamic random access memory (DRAM), flash memory, and the like. In another implementation, the memory may be a magnetic or optical disk drive, or other type of storage device. Further, while the memory is described as residing within the controllers, the memory may be located external to the controllers and coupled to the controllers by way of a dedicated connection, communication network, or other communication means.

Sensors 116 include airspeed sensors, altitude sensors, and the like. In the example provided, sensors 116 provide data for controllers 114 and 122 to use for image generation of tapes 124A-B.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the invention as set forth in the appended claims.

What is claimed is:

1. An aircraft, comprising:
an avionics system comprising:
a display screen configured to present an image arrangement that is visible to a user; and
a controller configured to:
generate curved tapes in the image arrangement to convey flight values to the user, wherein the curved tapes are configured to direct an eye of the user to a portion of the image arrangement; and
roll the curved tapes three-dimensionally based on changes to flight values of the aircraft to provide peripheral indication of changes to flight values when the flight values are changing, and wherein the controller is further configured to generate the curved tapes as a left tape and a right tape at a left side and a right side of the display screen with a distance between centers of the curved tapes being greater than a distance between ends of adjacent curved tapes.

2. The aircraft of claim 1, wherein the controller is further configured to generate curved Flight Mode Annunciation boxes in the image arrangement, wherein the curved Flight Mode Annunciation boxes are configured to accommodate additional graphical indications related to a Flight Mode of the aircraft.

3. The aircraft of claim 1, wherein the controller is further configured to generate the curved tapes as an altitude tape and an airspeed tape.

4. The aircraft of claim 1, wherein the controller is further configured to generate the curved tapes with a radius of 8.9 inches and a dimension of 0.3 radians.

5. The aircraft of claim 1, wherein the display screen is a Head-Up Display (HUD).

6. The aircraft of claim 1, wherein the controller is further configured to generate a flight path indicator at the portion of the image arrangement and to generate the curved tapes to direct the eye of the user to the flight path indicator as the portion of the image arrangement.

7. A computing device comprising a display screen, the computing device being configured to display on the display screen:

an image arrangement including navigational information for a vehicle; and curved tapes as a left tape and a right tape at a left side and a right side of the display screen that convey navigational values to a user and are configured to direct an eye of the user to a predefined portion of the image arrangement; and wherein the computing device is configured to roll the curved tapes three-dimensionally based on changes to the navigational values to provide peripheral indication of changes to the navigational values when the navigational values are changing, and where the computing device is further configured to generate the curved tapes with a distance between centers of the curved tapes being less than a distance between ends of the curved tapes.

8. The computing device of claim 7, the computing device being further configured to display on the screen curved Mode Annunciation boxes configured to accommodate additional graphical indicators related to a navigational mode indicated by the Mode Annunciation boxes.

9. The computing device of claim 7, the computing device being further configured to generate the curved tapes as an altitude tape and an airspeed tape.

10. The computing device of claim 7, the computing device being further configured to generate the curved tapes with a radius of 8.9 inches and a dimension of 0.3 radians.

11. The computing device of claim 7, wherein the display screen is a Head-Up Display (HUD).

12. The computing device of claim 7, the computing device being further configured to generate a navigational indicator at the predefined portion of the image arrangement and to generate the curved tapes to direct the eye of the user to the navigational indicator as the predefined portion of the image arrangement.

13. A Head-Up Display (HUD) comprising:

a HUD screen configured to present an image arrangement that is visible to a user; and a controller configured to:

generate curved tapes in the image arrangement to convey flight values to the user and to generate a navigational indicator, wherein the curved tapes are configured to direct an eye of the user to the navigational indicator in the image arrangement;

generate the curved tapes as a left tape and a right tape at a left side and a right side of the HUD screen with a distance between centers of the curved tapes being less than a distance between ends of the curved tapes; and roll the curved tapes three-dimensionally based on changes to flight values of the aircraft to provide peripheral indication of changes to flight values when the flight values are changing.

* * * * *